(12) United States Patent
Weber

(10) Patent No.: US 6,427,376 B1
(45) Date of Patent: Aug. 6, 2002

(54) FISHING ROD HOLDER

(76) Inventor: Eugene R. Weber, 5841 W. Sandra Dr., Appleton, WI (US) 54195

( * ) Notice: Subject to any disclaimer, the term of this patent is extended or adjusted under 35 U.S.C. 154(b) by 0 days.

(21) Appl. No.: 09/594,543

(22) Filed: Jun. 14, 2000

(51) Int. Cl.[7] .............................................. A01K 97/10
(52) U.S. Cl. ...................................... 43/21.2; 248/538
(58) Field of Search .................... 43/17, 21.2, 54.1; 248/538

(56) References Cited

U.S. PATENT DOCUMENTS

| | | | | | |
|---|---|---|---|---|---|
| 2,617,616 A | * | 11/1952 | Lavender | ...................... | 248/538 |
| 2,774,563 A | * | 12/1956 | Pribis | ......................... | 43/21.2 |
| 2,899,155 A | * | 8/1959 | Rogers | ........................ | 43/21.2 |
| 3,060,616 A | * | 10/1962 | Woodley | ....................... | 43/17 |
| 3,104,485 A | * | 9/1963 | Wallingford | ................ | 43/21.2 |
| 3,147,563 A | * | 9/1964 | Molter | .......................... | 43/17 |
| 3,327,978 A | * | 6/1967 | Gates | .......................... | 43/21.2 |
| 4,159,816 A | * | 7/1979 | Miyamae | .................... | 248/515 |
| 4,479,322 A | * | 10/1984 | Koppel | ........................ | 43/21.2 |
| 4,676,019 A | * | 6/1987 | Engles | ........................ | 43/21.2 |
| 5,152,494 A | * | 10/1992 | Frunzar | ....................... | 248/513 |
| 5,913,673 A | * | 6/1999 | Womac | ....................... | 43/54.1 |

* cited by examiner

Primary Examiner—Kurt Rowan
(74) Attorney, Agent, or Firm—Michael Best & Friedrich LLP

(57) ABSTRACT

A fishing rod holder. The fishing rod holder includes a base member, a front rod support member movable between an upright position and a folded down position, a rear rod support member movable between an upright position and a folded down position, a spacer member movable between a use position, in which said spacer member engages the front rod support member and the rear rod support member to hold the front rod support member and the rear rod support member in the upright position, and a non-use position, in which the front rod support member and the rear rod support member are pivotable to the folded down position, and an extendible foot member. The front rod support member defines a notch for supporting a tip portion of the fishing rod, an aperture for securing the fishing rod, and a slot extending between the notch and the aperture. In the use position, the dimension of the rod holder is larger than a dimension of an ice fishing hole so that the ice fishing rod holder is prevented from moving through the ice fishing hole.

15 Claims, 7 Drawing Sheets

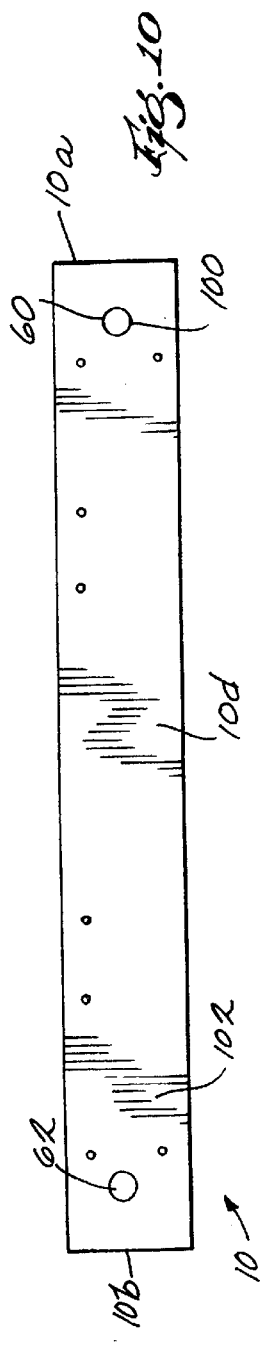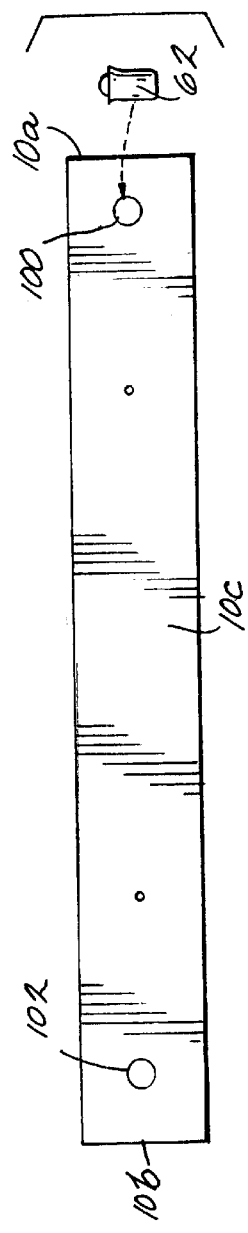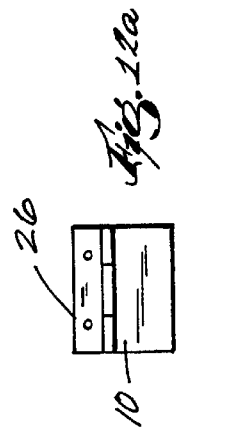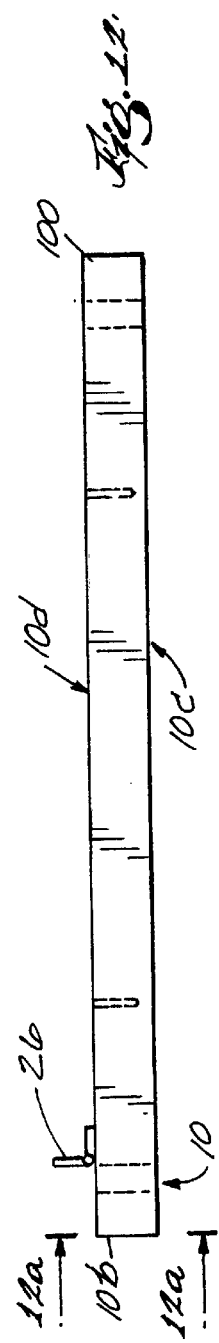

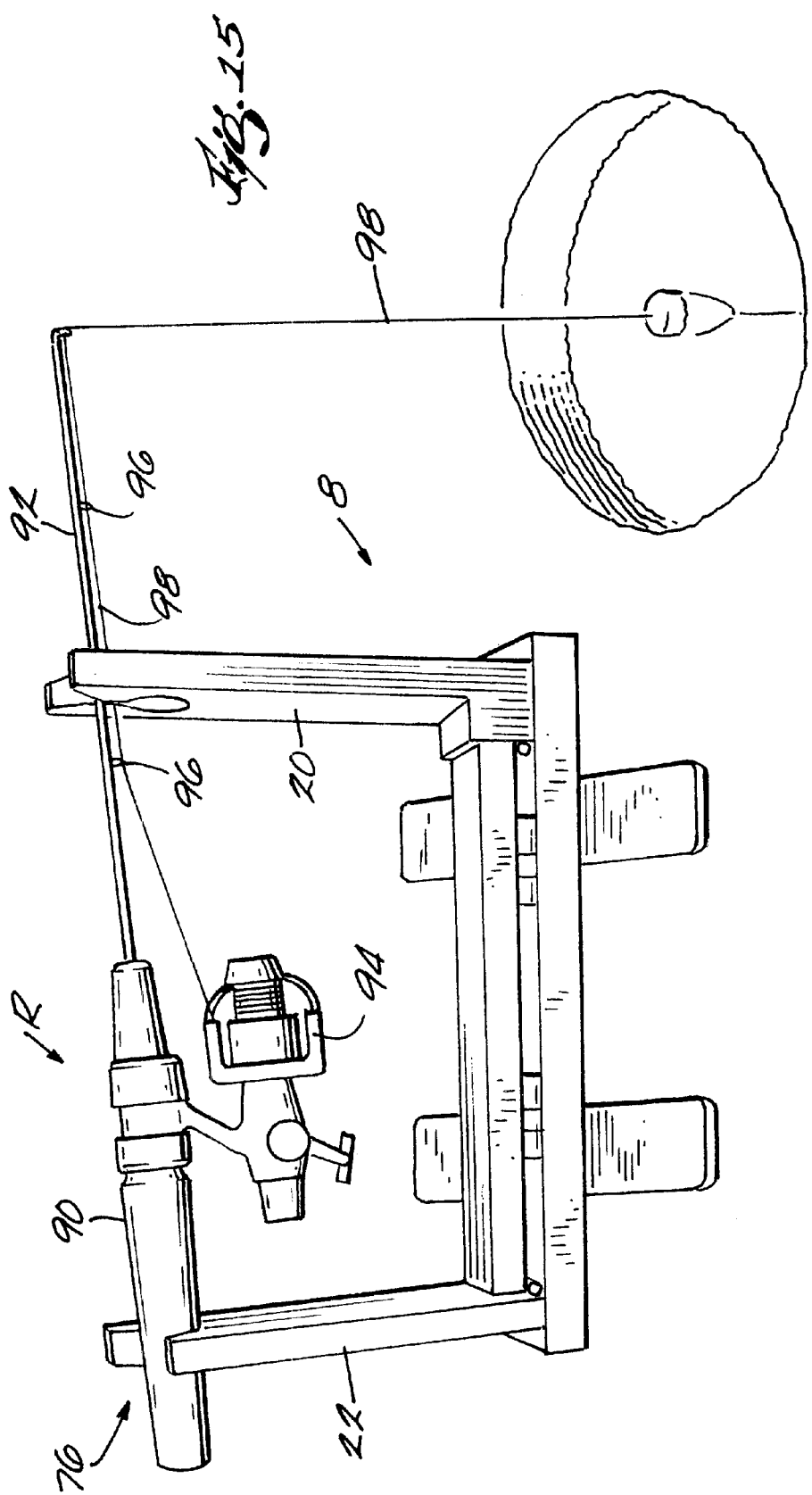

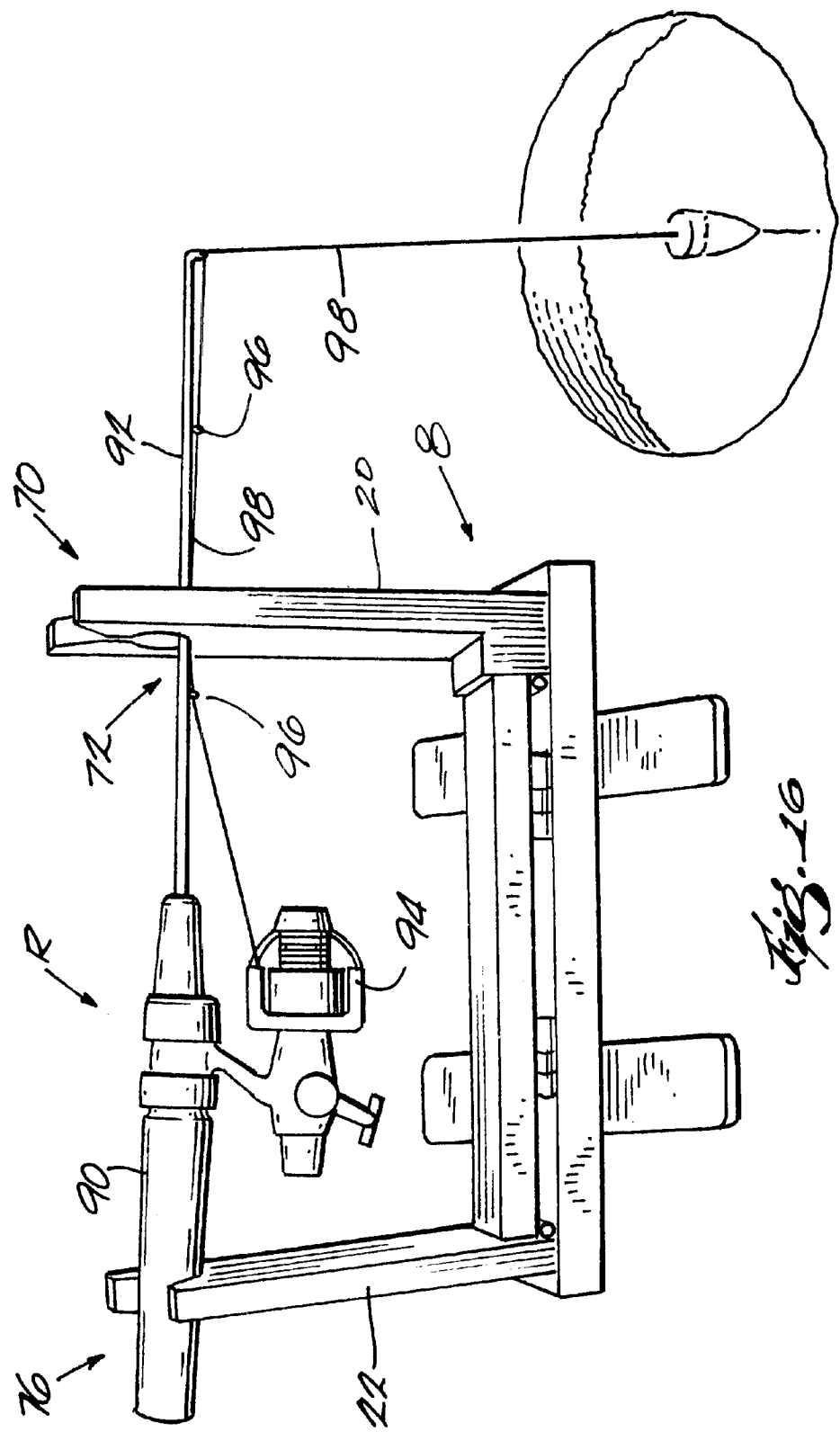

US 6,427,376 B1

FISHING ROD HOLDER

BACKGROUND OF THE INVENTION

1. Technical Field

The present invention relates generally to a fishing rod holding device, and, more particularly, to an ice fishing rod and reel holding device.

2. Related Prior Art

Fishing rod holding devices are used to hold a fishing rod unattended between fish strikes. Illustrative of prior art holder devices are U.S. Pat. No. 4,594,805 to McClelland and U.S. Pat. No. 5,025,584 to Butterwick, Sr., which are particularly adapted to holder devices for ice fishing rod and reels.

McClelland '805 discloses a fishing rod holder including front and rear supports hinged on a base piece. The front and rear supports may be folded down onto the base piece. The fishing rod holder also includes a fixed rear wall against which the handle of the fishing rod rests. The front support is longer than the rear support, so that the fishing rod extends at a 45 degree angle from its resting point against the fixed rear wall through a groove in the rear support to a groove in the front support.

Butterwick '584 discloses a fishing rod holder including a base, a front support mounted on the base by a spring-loaded hinge and a rear support mounted on the base by a spring-loaded hinge. The hinges urge the front and rear supports toward an upright position. The front and rear supports are reasonably held in a folded down position by a retainer mechanism.

SUMMARY OF THE INVENTION

An object of the invention is to provide a fishing rod holder that includes means for preventing a fishing rod supported on the holder from being pulled off the holder device.

Another object of the invention is to provide a more stable, convenient and compact fishing rod holder.

In a basic form, the present invention relates to an apparatus for supporting a fishing rod and which includes a base member and at least one rod support member interconnected with the base member. Alternatively, the invention relates to a fishing rod holder that includes a base member, at least one rod support member (preferably two) attached to the main base member, and a spacer member foldable to a position engaging the rod support member so as to hold the rod support in an upright, extend or usable position.

In a preferred form, two rod supports are pivotably (e.g., by hinges) supported on the base member and such that one of said rod support is foldable over the other rod support. Also, the holder includes at least one or more foot members extendible outward so as to prevent the rod holder form tipping.

Alternatively, the invention relates to a holder device adapted for use with a rod for ice fishing including a main base member and a support base member foldable over the main base member. The present invention includes a front rod support and a rear rod support attached to the main base member. The rod supports are held in an upright position by the support base member. Also, the rod supports are arranged so that one rod support folds over the other rod support into a transportable position. In addition, the present invention includes feet members attached to the main base member in order to prevent lateral tip.

It is a feature and an advantage of the present invention to provide a biasing mechanism predisposing the rod supports to a folding position.

It is a feature and an advantage of the present invention to provide an offset portion attached to one of the rod supports to approximate the thickness of the other rod support so that one rod support can be folded over the other rod support.

It is a feature and an advantage of the present invention to provide a security latch attached to the front rod support that can be rotated over the fishing rod to prevent movement of the rod.

It is a feature and an advantage of the present invention to provide a notch on the top surface of the front rod support for placement of a fishing hook.

It is a feature and an advantage of the present invention to provide an eyelet on the rear surface of the rear rod support for placement of a fishing hook.

Other features and advantages of the invention will become apparent to those skilled in the art upon review of the following detailed description, claims and drawings.

DESCRIPTION OF THE DRAWINGS

FIG. 10 is a top plan view of a base member of the fishing rod holder.

FIG. 11 is a bottom plan view of the base member.

FIG. 12 is a side elevational view of the base member.

FIG. 12a is a view taken generally along line 12a—12a in FIG. 12.

FIG. 15 is a perspective view of the fishing rod holder device in use with a common ice fishing rod.

FIG. 16 is a perspective view similar to FIG. 15 showing the position of an ice fishing rod in position with the alternate arrangement of the front rod support illustrated in FIG. 7.

Figure 1:
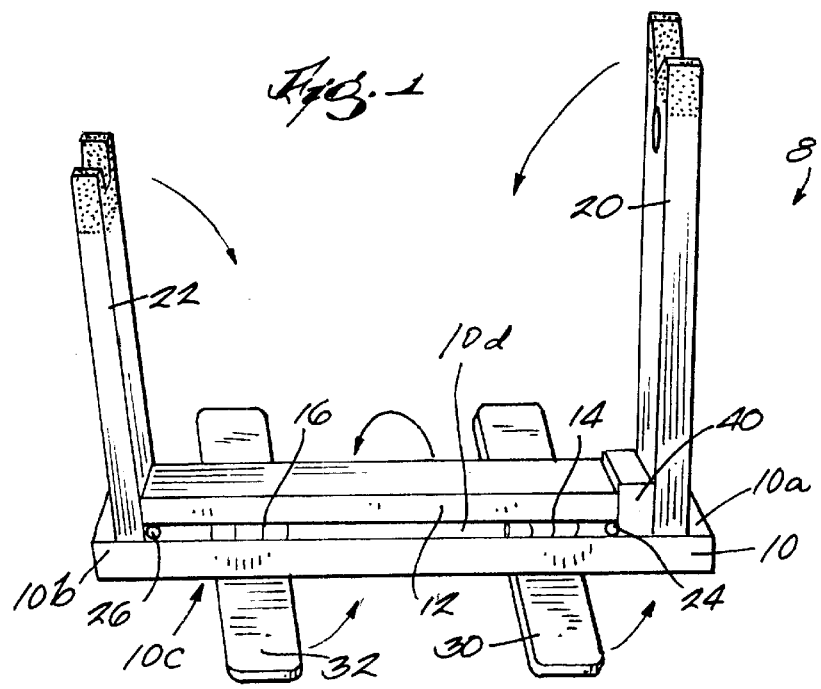
FIG. 1 is a side perspective view of a fishing rod holder device incorporating various features of the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

FIG. 1 depicts a fishing rod holder 8 embodying various features of the invention and positioned for use to support a fishing rod R as illustrated in FIG. 15. As will become apparent below, the rod holder 8 is particularly adapted for use with an ice fishing rod and reel.

The rod holder 8 includes an elongated base member 10 having a front end 10a, a back end 10b, a generally flat bottom surface 10c, and a generally flat top surface 10d. A pivotable first or front upright or rod support 20 is supported on and connected by a hinge to the top surface 10d proximate the front end 10a and a pivotable second or rear upright or rod support 22 is supported on and connected by a hinge to the top surface 10d proximate the back end 10b. The front and rear rod supports 20 and 22 are pivotable to a generally upright position wherein the rod supports 20 and 22 are spaced apart and disposed in generally parallel relation as best shown in FIG. 1.

Figure 2:
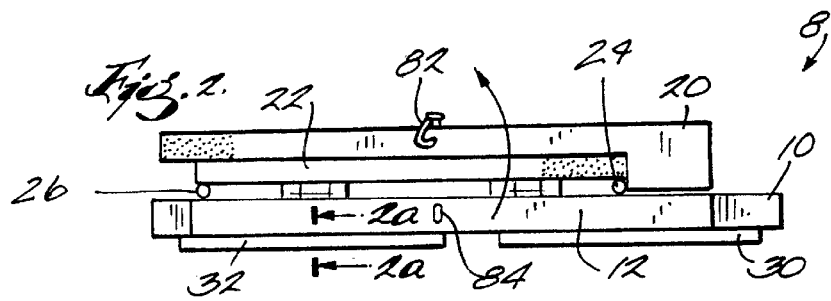
FIG. 2 is a side elevational view of the fishing rod holder device in a folded down position.

An elongated spacer or locking member 12 is connected by a hinge to the base member 10 for pivotal movement between an unfolded or unlocking position disposed along one edge of the base member 10 as shown in FIG. 2 to a folded over or locking position disposed on top of the base member 10 as shown in FIG. 1. The distance between the front rod support 20 and the rear rod support 22 approximates the length of the locking member 12 so that, when the locking member 12 is folded over the base member 10 and placed in its locking position, it fits snugly between the front and rear rod supports 20 and 22. In this folded over locking position, the locking member 12 secures or locks the front and rear rod supports 20 and 22 in a generally upright position for use.

The front and rear rod support members 20 and 22 may be fastened or connected onto the base member 10 by any of a number of conventional pivotal means, as may be the locking member 12. The locking member 12 may also be detached from the base member 10, and manually placed in between the rod supports 20 and 22 to lock them in the use position.

Referring to FIG. 1, the front rod support 20 includes an offset portion 40 disposed on the lower end of the front rod support 20 and fastened to the front end 10a of the base member 10 by hinge 24 for relative pivotal movement. The lower end of the rear support member 22 is fastened via a hinge 26 to the back end 10b of the base member 10 for relative pivotal movement. The locking member 12 is connected by hinges 14 and 16 to the top surface 10d and along one edge of the base member 10 for relative pivotal movement.

The rod holder 8 includes feet members 30 and 32 which are mounted by pins or the like to the bottom surface 10c of the base member 10 for relative pivotal movement. The feet members 30 and 32 can be rotated to a use position shown in FIG. 1 where they are generally perpendicular to the longitudinal axis of the base member. In this use position, the feet members 30 and 32 serve to prevent the rod holder a from tipping over laterally. The feet members 30 and 32 can be rotated to a storage or non-use position where they are generally aligned with the longitudinal axis of the base member 10 as best shown in FIGS. 2 and 3.

Figure 2A:
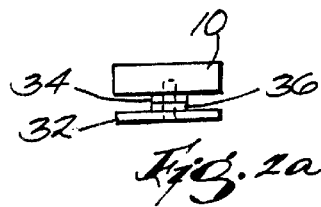
FIG. 2a is a cross-sectional view taken generally along line 2a—2a in FIG. 2.

As shown in FIG. 2a, washer members 34 and 36 are provided between the bottom surface 10c of the base member 10 and the feet members 30 and 32. The washer members 34 and 36 provide smooth movement of the feet members 30 and 32 between the use position and the nonuse position. Also, at least one of the washer members 34 is formed of a resilient material, such as rubber, to accommodate wear during continued use of the rod holder 8 and prevent the feet members 30 and 32 from becoming wobbly or unstable in the use position.

Figure 3:
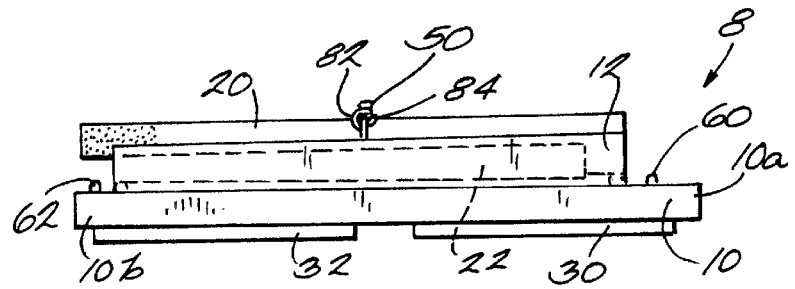
FIG. 3 is a side elevational view of the fishing rod holder device in a transportable position.

FIG. 2 depicts the rod holder 8 in the non-use position and FIG. 3 depicts the rod holder 8 in a transport position. In the non-use position, the rear rod support 22 rests on the top surface 10d of the base member 10. The front rod support 20 rests or is closely adjacent to the outside surface of the rear support 22 in a position generally parallel to both the rear rod support 22 and the base member 10. As best shown in FIG. 2, the length of the offset portion 40 preferably approximates the thickness of the rear rod support 22 so that the front rod support may be folded and rest on the outside surface of the rear rod support 22.

As best shown in FIG. 2, to permit the rod holder to be moved to a non-use position, the locking member 12 must be disengaged from the front and rear rod supports 20 and 22 and folded downwardly to a position generally coplanar with the base member 10 where the front and rear rod supports 20 and 22 may be folded down as described above. As best shown in FIG. 3, the locking member 12 thereafter may be folded 90° back toward the rear rod holder 22 where it is disposed adjacent one edge of the rear holder 22. A securing mechanism consisting of a latch hook 82 on the outside surface of the front end support 20 and an eyelet catch 84 on one edge of the locking edge of the locking member 12 may be used to secure the locking member 12 in this folded up position. The securing mechanism also secures the front and rear rod supports 20 and 22 in folded down positions.

As best shown in FIG. 3, the feet members 30 and 32 can be rotated 90° to a position where they are generally aligned with the longitudinal of the base member 10 for transporting and/or storing the rod holders. When the rod holder 8 is in the transport position, the longitudinal axes of the front and rear rod support members 20 and 22, the locking member 12, the base member 10 and the feet members 30 and 32 are generally parallel. Thus, the rod holder 8 can be folded into a compact form to facilitate transportation and/or storage in an automobile trunk or the like.

Referring to FIGS. 10, 11 and 12, the base member 10 includes spring loaded pins or bullet catches 60 and 62 which respectfully bias the front and rear rod support members 20 and 22 into engagement with respective opposite ends of the locking member 12 to provide stability. The bullet catches 60 and 62 are located at positions where the front and rear rod supports 20 and 22, respectively, engage the top surface 10d of the base member 10.

Both or one of the bullet catches 60 and 62 can be replaced with a counter sunk wood screw which is turned counterclockwise (raised) a small amount to engage the bottom of a rod support before it is in the upright position, thereby providing an adjustable tension for stability.

Figure 4:
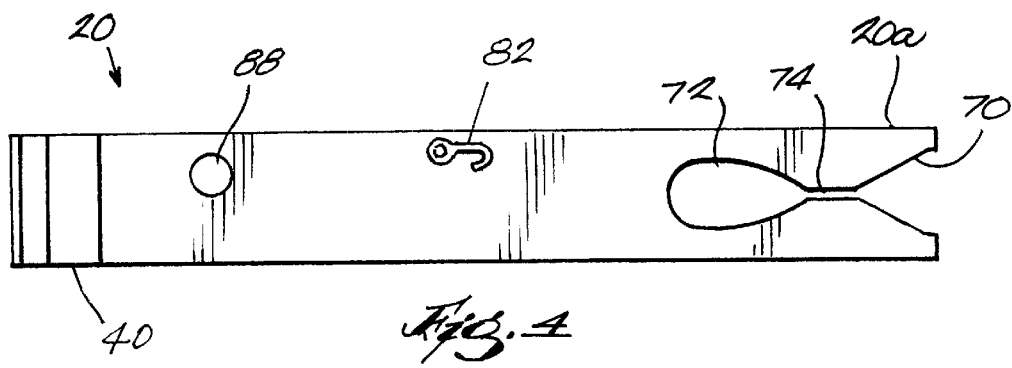
FIG. 4 is a plan view of a front rod support of the fishing rod holder device lying down with the inside surface facing upwardly.
Figure 5:
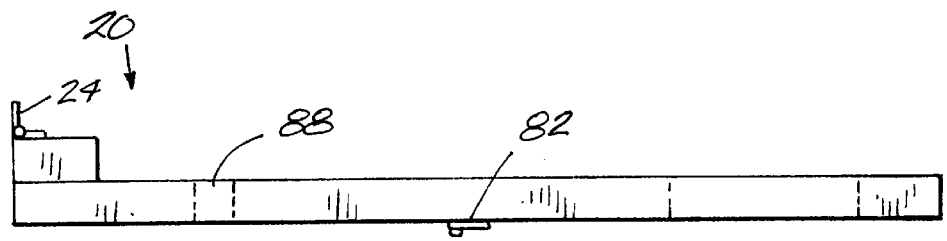
FIG. 5 is a side view of the front rod support illustrated in FIG. 4.
Figure 6:
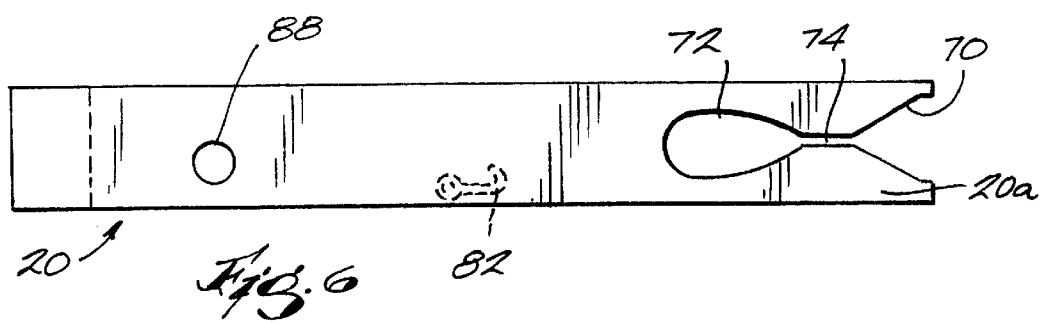
FIG. 6 is a view similar to FIG. 4 with the outside surface facing upwardly.

FIGS. 4–6 illustrate further detail of the front rod support 22. As best shown in FIG. 4, a top portion 20a of the front rod support 20 has a generally V-shaped notch 70, a generally tear-drop shaped aperture 72 and a narrow slot 74 extending between the notch 70 and aperture 72.

Figure 7:
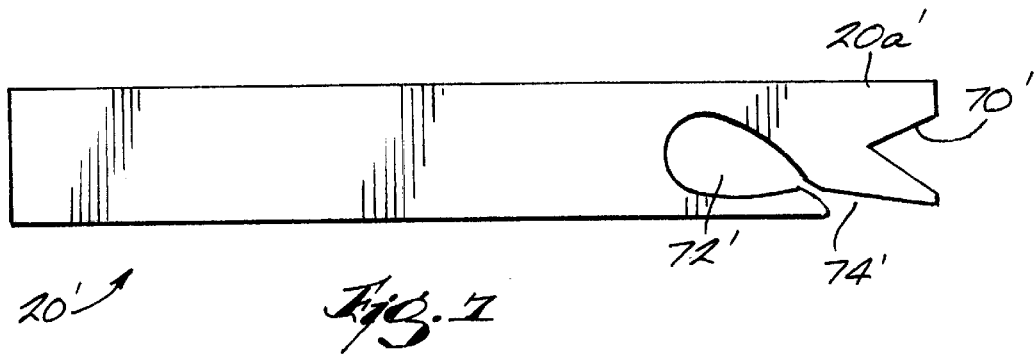
FIG. 7 is a view similar to FIG. 4 illustrating an alternate arrangement for the front rod support.

FIG. 7 illustrates an alternate arrangement for the front rod support including a V-shaped notch 70' in the top portion 20a' of the front rod support 20', a generally tear drop-shaped aperture 72' slightly rotated from the position of the aperture 72 illustrated in FIG. 4 so that the narrowest part extends toward one edge of the front rod support 20' and a slot 74' which extends from the aperture 72' to a side of the front rod support 20.

Figure 8:
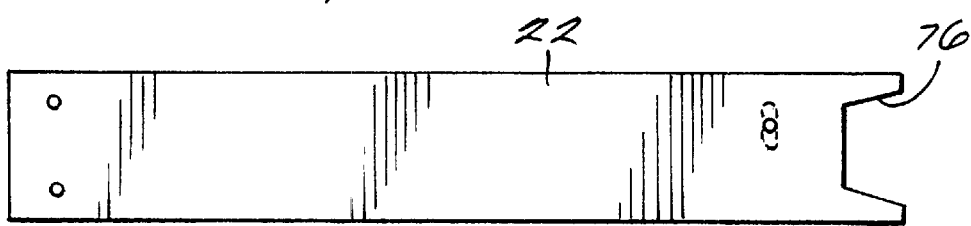
FIG. 8 is a plan view of a rear rod support of the fishing rod holder device lying down with the inside surface facing upwardly.
Figure 9:
FIG. 9 is a side view of the rear rod support illustrated in FIG. 8.
Figure 13:
FIG. 13 is a top plan view of a locking member or spacer of the fishing rod holder device.
Figure 14:
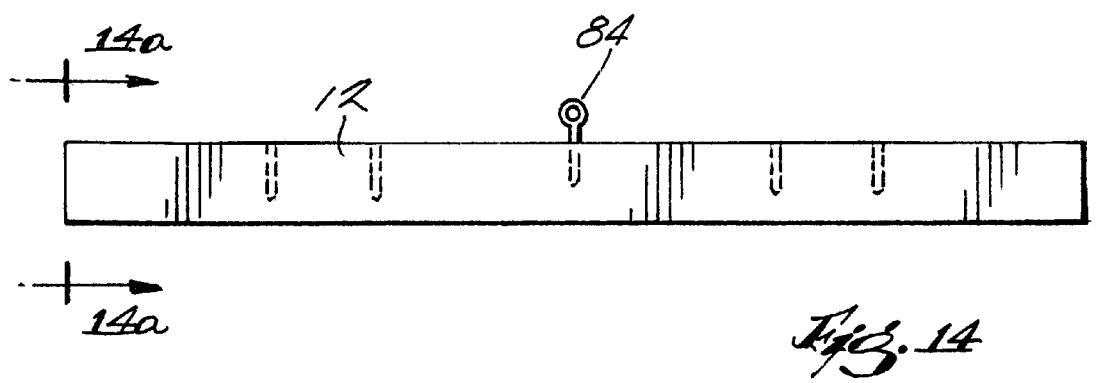
FIG. 14 is a side elevational view of the locking member.
Figure 14A:
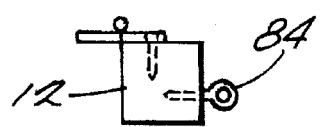
FIG. 14a is a view taken generally along line 14a—14a in FIG. 14.

Referring to FIGS. 8 and 9, the top portion of the rear support has a generally U-shaped notch 76. A fishing rod R may be supported on the rod holder 8 with the hand grip 90 resting in the U-shaped notch 76 of the rear rod support 22 and the tip portion 92 resting in the V-shaped notch 70 of the front rod support 20 as illustrated in FIG. 16.

Referring to FIG. 16, the fishing rod R can be supported on the rod holder 8 with the hand grip 90 resting in the U-shaped notch 76 and the tip portion 92 resting inside the aperture 72 after the line 98 is guided through the slot 74. The maximum dimension of the aperture 72 is smaller than a portion of the fishing rod R, such as the hand grip 90, the reel assembly 94 or at least one of the fishing rod line guides 96, so that the fishing rod R cannot be pulled through the aperture 72 and off the rod holder 8.

Also, the dimension of the slot 74 is smaller than the width of the tip portion 92. However, the line 98 is able to passed through the slot 74 so that the tip portion 92 can be quickly moved from the V-notch 70 and into the aperture 72 while the line 98 is in the water. Thus, the fishing rod R can be left unattended with the line 98 in the water without fear of the fishing rod R being pulled off the rod holder.

When the front rod support 20' is arranged in the manner illustrated in FIG. 7 and the user desires to leave the fishing rod R unattended, the tip portion 92 can be lifted from the V-shaped notch 70 and guided through the slot 74' into the aperture 72'. Again, the maximum dimension of the aperture 72' is smaller than a portion of the fishing rod R, such as the hand grip 90, the reel assembly 94 or at least one of the fishing rod line guides 96, so that the fishing rod R cannot be pulled through the aperture 72' and off the rod holder 8.

One advantage of the arrangement illustrated in FIG. 7 is that the tip portion 92 of the fishing rod R cannot inadvertently drop through the slot 74' into the aperture of 72'. This is particularly advantageous when more slender fishing rods are used.

As shown in FIGS. 15 and 16, the rod holder 8, when disposed in the use position, is designed to be wider, longer, and taller than the typical ice fishing hole. More specifically, the length of the feet members 30 and 32 and base member 10, and the heights of the rod supports 20 and 22 are sufficiently long (when these members are extended to their use positions) to prevent the rod holder 8 of being pulled through the ice hole.

Referring to FIG. 9, the rear rod support 22 is equipped with screwable hook eyelet 86 disposed on a rear surface near the top surface of the rear rod support 22. When the rod holder 8 is in use, the hook eyelet 86 may be used to secure a fishing hook (e.g., when baiting the hook). Referring to FIGS. 4 and 6, the front rod support 20 is equipped with a hole 88. The hole 88 is positioned so that it is in alignment with the hook eyelet 86 when the front rod support 20 is folded over the rear rod support 22. Thus, the hole eyelet 86 extends upwardly into the hole 88 so as not to interfere with the engagement of the front rod support 20 with the rear rod support 22, and the rod holder 8 is kept "streamlined" when in the transport or transportable position.

While several embodiments of the present invention have been shown and described above, alternate embodiments will be apparent to those skilled in the art and are within the intended scope of the present invention. Therefore, the invention is to be limited only by the following claims.

I claim:

1. An apparatus for supporting a fishing rod comprising:
   a base member for resting on a generally flat surface;
   a first rod support member mounted on said base member for pivotal movement between an upright position and a folded down position, in which said first rod support member is generally parallel to said base member;
   a second rod support member mounted on said base member and spaced rearwardly from said first rod support member for pivotal movement between an upright position and a folded down position, in which said second rod support member is generally parallel to said base member;
   a spacer member mounted on said base member for pivotal movement between a use position, in which said spacer member engages said first rod support member and said second rod support member to hold said first rod support member and said second rod support member the upright position, and a non-use position, in which said first rod support member and said second rod support member are pivotable to the folded down position; and
   an offset portion attached to the first rod support member, the offset portion having a thickness which is approximately the same as a thickness of the second rod support member, wherein, in the folded down position, the second rod support member rests on the base member and the first rod support member is elevated by the offset portion to rest on the second rod support member.

2. The fishing rod holder of claim 1, further comprising an extendible foot member attached to the base member, wherein the extendible foot member is pivotable between a use position, in which the foot member is generally perpendicular to the base member, and a non-use position, in which the foot member is generally parallel to the base member.

3. The fishing rod holder of claim 1, wherein the second rod support member defines a notch for supporting a hand grip of the fishing rod.

4. The fishing rod holder of claim 1, further comprising a biasing mechanism for biasing the first rod support member and the second rod support member to the folded down position.

5. The fishing rod holder of claim 1, further comprising an eyelet on the second rod support member for retaining a fishing hook.

6. The fishing rod holder of claim 1, wherein, in the use position, a dimension of the rod holder is larger than a dimension of an ice fishing hole, the ice fishing rod holder thereby being prevented from moving through the ice fishing hole.

7. An apparatus for supporting a fishing rod comprising:
   a base member for resting on a generally flat surface;
   a first rod support member mounted on said base member for pivotal movement between an upright position and a folded down position, in which said first rod support member is generally parallel to said base member;
   a second rod support member mounted on said base member and spaced rearwardly from said first rod support member for pivotal movement between an upright position and a folded down position, in which said second rod support member is generally parallel to said base member;

a spacer member mounted on said base member for pivotal movement between a use position, in which said spacer member engages said first rod support member and said second rod support member to hold said first rod support member and said second rod support member the upright position, and a non-use position, in which said first rod support member and said second rod support member are pivotable to the folded down position; and a securing mechanism including a latch hook on one of the spacer member and the first rod support member, and an eyelet on an other of the spacer member and the first rod support member, wherein, when the latch hook engages the eyelet, the spacer member, the first rod support member and the second rod support member are secured in the folded down position.

8. The fishing rod holder of claim 7, further comprising an extendible foot member attached to the base member, wherein the extendible foot member is pivotable between a use position, in which the foot member is generally perpendicular to the base member, and a non-use position, in which the foot member is generally parallel to the base member.

9. The fishing rod holder of claim 7, wherein the second rod support member defines a notch for supporting a hand grip of the fishing rod.

10. The fishing rod holder of claim 7, further comprising a biasing mechanism for biasing the first rod support member and the second rod support member to the folded down position.

11. The fishing rod holder of claim 7, further comprising an eyelet on the second rod support member for retaining a fishing hook.

12. The fishing rod holder of claim 7, wherein, in the use position, a dimension of the rod holder is larger than a dimension of an ice fishing hole, the ice fishing rod holder thereby being prevented from moving through the ice fishing hole.

13. An apparatus for supporting a fishing rod comprising:

an elongated base member for resting on a generally flat surface;

a front rod support member mounted on said base member for pivotal movement between an upright position and a folded down position, in which said front rod support member is generally parallel to said base member;

a rear rod support member mounted on said base member and spaced rearwardly from said front rod support member for pivotal movement between an upright position and a folded down position, in which said rear rod support member is generally parallel to said base member;

a spacer member mounted on said base member for pivotal movement between a use position, in which said spacer member engages said front rod support member and said rear rod support member to hold the front rod support member and the rear rod support member in the upright position, and a non-use position, in which said front rod support member and said rear rod support member are pivotable to the folded down position;

an extendible foot member attached to the base member, wherein the extendible foot member is pivotable between a use position, generally perpendicular to the base member, and a non-use position, generally parallel to the base member; and an offset portion attached to the front rod support member, the offset portion having a thickness approximately the same as a thickness of the rear rod support member, wherein, in the folded down position, the rear rod support member rests on the base member and the front rod support member is elevated by the offset portion to rest on the rear rod support member.

14. The fishing rod holder of claim 13, further comprising a biasing mechanism for biasing the front rod support member and the rear rod support member to the folded down position.

15. An apparatus for supporting a fishing rod comprising:

an elongated base member for resting on a generally flat surface;

a front rod support member mounted on said base member for pivotal movement between an upright position and a folded down position, in which said front rod support member is generally parallel to said base member;

a rear rod support member mounted on said base member and spaced rearwardly from said front rod support member for pivotal movement between an upright position and a folded down position, in which said rear rod support member is generally parallel to said base member;

a spacer member mounted on said base member for pivotal movement between a use position, in which said spacer member engages said front rod support member and said rear rod support member to hold the front rod support member and the rear rod support member in the upright position, and a non-use position, in which said front rod support member and said rear rod support member are pivotable to the folded down position;

an extendible foot member attached to the base member, wherein the extendible foot member is pivotable between a use position, generally perpendicular to the base member, and a non-use position, generally parallel to the base member; and a securing mechanism including a latch hook on one of the spacer member and the front rod support member, and an eyelet on an other of the spacer member and the front rod support member, wherein, when the latch engages the eyelet, the spacer member, the front rod support member, and the rear rod support member are secured in the folded down position.

* * * * *

UNITED STATES PATENT AND TRADEMARK OFFICE
CERTIFICATE OF CORRECTION

PATENT NO. : 6,427,376 B1
DATED : August 6, 2002
INVENTOR(S) : Eugene R. Weber

It is certified that error appears in the above-identified patent and that said Letters Patent is hereby corrected as shown below:

<u>Title page,</u>
Item [56], References Cited, U.S. PATENT DOCUMENTS, please add the following
-- 3,159,366,  Knight,         08/02/1962
3,724,115,    Derie,          04/03/1973
4,106,811,    Hernandez,      08/15/1978
4,133,131,    Davy,           01/09/1979
4,463,511,    Copfer,         08/07/1984
4,581,840,    Guith, II,      04/15/1986
4,594,805,    McClelland,     06/17/1986
5,025,584,    Butterwick, Sr., 06/25/1991 --

Signed and Sealed this

Eighteenth Day of March, 2003

JAMES E. ROGAN
*Director of the United States Patent and Trademark Office*